United States Patent
Shields

(10) Patent No.: US 8,256,899 B1
(45) Date of Patent: Sep. 4, 2012

(54) SYSTEM AND METHOD FOR SUPPORTING A CAMERA THAT ENABLES COMPLEX CAMERA MOVEMENTS TO BE ACCURATELY REPEATED

(76) Inventor: Kevin E. Shields, Bensalem, PA (US)

(*) Notice: Subject to any disclaimer, the term of this patent is extended or adjusted under 35 U.S.C. 154(b) by 367 days.

(21) Appl. No.: 12/536,474

(22) Filed: Aug. 5, 2009

(51) Int. Cl.
*G03B 15/00* (2006.01)

(52) U.S. Cl. .................. 352/243; 352/44; 348/208.2

(58) Field of Classification Search .......... 352/243, 352/234, 244, 53, 44, 85, 87, 88; 396/419, 396/428, 528; 348/142, 208.2, 373; 248/177.1, 248/187.1, 179.1
See application file for complete search history.

(56) References Cited

U.S. PATENT DOCUMENTS

| | | | |
|---|---|---|---|
| 5,671,932 A | 9/1997 | Chapman | |
| 5,900,925 A * | 5/1999 | Navarro | 352/53 |
| 7,037,006 B2 | 5/2006 | Chapman | |
| 2003/0174289 A1* | 9/2003 | Nakano | 353/31 |
| 2005/0007553 A1* | 1/2005 | Romanoff et al. | 352/243 |

* cited by examiner

*Primary Examiner* — William C Dowling
(74) *Attorney, Agent, or Firm* — LaMorte & Associates, P.C.

(57) ABSTRACT

A system and method for reproducing complex camera movements that are made during a recorded scene so that camera movements can be precisely reproduced. A camera is mounted onto a camera support system. The camera support system has multiple articulated joints that enable the camera support system to move the camera through a wide range. Sensors are provided at each of the articulated joints to sense any changes in orientation experienced during a scene. The sensors create corresponding data signals indicative of the movement. A scene is shot with the camera. During the scene, the camera has a shooting position that is altered using the camera support system. The sensors detect the movements and the data signals produced are saved in an electronic memory. The saved data signals are used at a later time to reproduce movements of the camera support system.

12 Claims, 2 Drawing Sheets

SYSTEM AND METHOD FOR SUPPORTING A CAMERA THAT ENABLES COMPLEX CAMERA MOVEMENTS TO BE ACCURATELY REPEATED

BACKGROUND OF THE INVENTION

1. Field of the Invention

In general, the present invention relates to dollies, carts, booms, and cranes that are used to support and move video cameras and motion film cameras. More particularly, the present invention relates to dollies, cranes, carts, booms and cranes that have electronic motion controls.

2. Prior Art Description

In the past two decades, the use of motion film cameras have been nearly completely replaced by the use of video cameras. Video cameras are used to record motion pictures, television shows, commercials, and personal postings for social websites of the Internet.

Video cameras have the ability to zoom in and out. However, if a videographer wants the camera to pan, tilt, or otherwise change perspective, the video camera itself must be physically moved.

Often a camera is moved by manually lifting the camera and walking it to a new location. This method of camera movement has many disadvantages. Primary among these disadvantages are that the movement of the camera is not smooth and appears choppy. Secondly, the exact movement of the camera cannot be precisely reproduced. Accordingly, each time a scene is repeated, the recorded shot will be slightly different from all the other shots. Thirdly, the camera can only be moved within the range of the camera operator's arms.

In order to decrease the choppiness of a manually moved camera, cameras are often mounted on dollies or carts that can be rolled smoothly between locations. To increase the range of the camera, the camera is also often mounted to the end of an adjustable boom arm on the dolly. Such camera support systems are exemplified by U.S. Pat. No. 5,671,932 to Chapman, entitled Camera Crane and U.S. Pat. No. 7,037,006 to Chapman, entitled Camera Crane.

Although wheeled camera dollies and booms exist, and many of those prior art systems are motorized, the activation of the various motors is still done manually. That is, if a videographer wants a dolly to move forward, a cameraman presses a bottom on a motorized dolly and the dolly rolls forward. Likewise, if a videographer wants a camera to rise, a cameraman activates a motor on a boom that raises the camera. Since the activation of all motors that control camera position are manually controlled, an exact reproduction of movement cannot be precisely obtained. Each time a camera is moved, the cameraman will engage and disengage the various motor controls at slightly different times, thus resulting in slightly different camera angles each time a shot is repeated.

In many video productions, computer graphics and other special effects are added to a prerecorded image. This often requires a scene to be shot twice, using the exact same camera movements. One shot is for the principal actors. One shot is for the special effects. The two shots are then superimposed to create the final production shot. Often the special effects may be created on a set that is at a different location from the set of principal photography. Using manually operated dollies and booms, it is often very difficult to precisely reproduce the exact movements of a camera used during a particular shot.

A need therefore exists for a system and method of controlling the movements of a camera on a dolly or boom so that the precise movements of a camera can be recorded and then exactly reproduced at another time. In this manner, the exact positions of the camera can be duplicated in shot after shot. These needs are met by the present invention as described and claimed below.

SUMMARY OF THE INVENTION

The present invention is a system and method for reproducing complex camera movements that are made during a recorded scene. In this manner, the camera movements can be precisely reproduced if that scene needs to be reproduced.

In order to save the movements of a camera, the camera is mounted onto a camera support system. The camera support system has multiple articulated joints that enable the camera support system to move the camera through a wide range of motions. Sensors are provided at each of the articulated joints to sense any changes in orientation experienced during a scene. The sensors create corresponding data signals indicative of the movement.

A scene is shot with the camera. During the scene, the camera has a shooting position that is altered using the camera support system. The sensors detect the movements and the data signals produced are saved in an electronic memory. The saved data signals are used at a later time to reproduce movements of the camera support system. In this manner, the camera movements of a particular scene can be exactly reproduced without the need for experimentation and/or comparison.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention camera support system can be embodied in many ways, the embodiment illustrated shows the camera support system configured as a mobile camera crane having a boom arm that is supported by a wheeled cart. This embodiment is selected in order to set forth the best mode contemplated for the invention. The illustrated embodiment, however, is merely exemplary and should not be considered a limitation when interpreting the scope of the appended claims.

Figure 1:
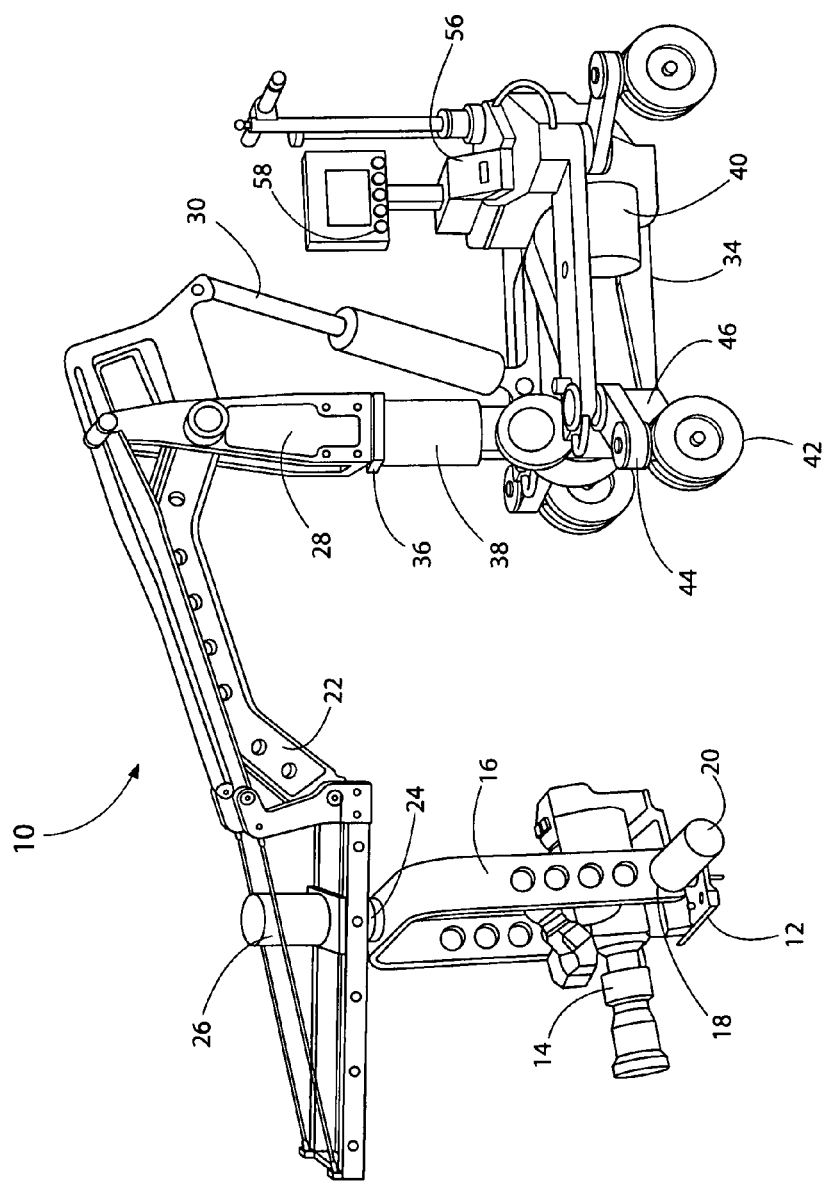
FIG. 1 is a perspective view of an exemplary embodiment of a camera support system holding a camera.
Figure 2:
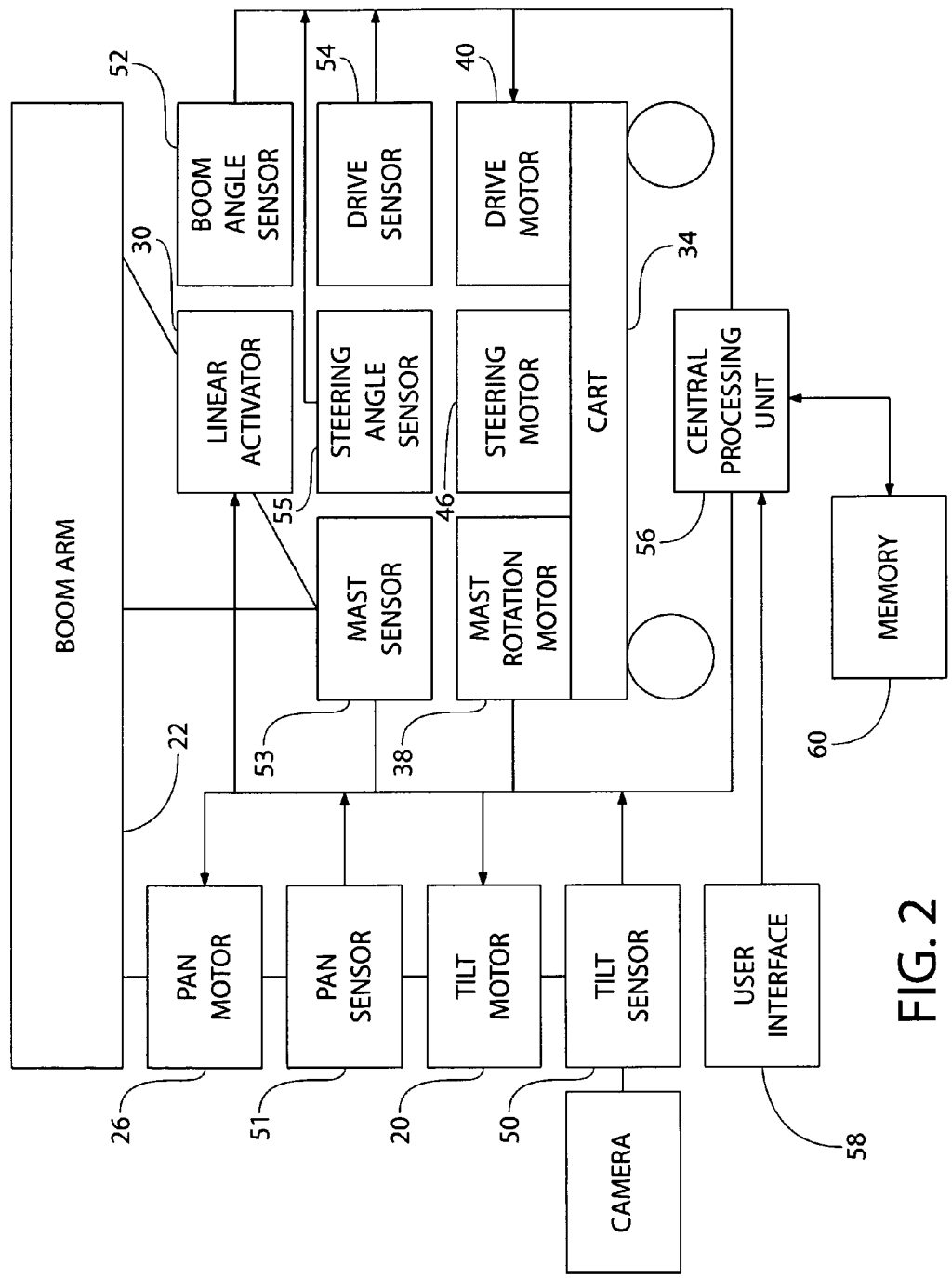
FIG. 2 is a schematic of the camera support system shown in FIG. 1.

Referring to FIG. 1 and FIG. 2, a camera support system 10 is shown. The camera support system 10 has a camera mount platform 12 for holding a camera 14. The camera 14 can be a video camera or a film camera. The camera mount platform 12 is coupled to a yoke support 16 with a first articulated joint 18. This enables the camera mount platform 12 and the camera 14 it holds to selectively tilt up and down. The movement of the camera mount platform 12 and the camera 14, relative to the yoke support 16 is controlled by a tilt motor 20.

The yoke support 16 is suspended from a boom arm 22. A second articulated joint 24 interconnects the yoke support 16 to the boom arm 22. The second articulated joint 24 enables the yoke support 16, camera mount platform 12, and camera 14 to pan to the left and right. The movement of the yoke support 16 relative the boom arm 22 is controlled by a pan motor 26.

The boom arm 22 is supported by a vertical mast 28. The vertical mast 28 serves as a fulcrum support for the boom arm 22, wherein the boom arm 22 can teeter upon the vertical mast 28. The teetering movement of the boom arm 22 is controlled by a linear activator 30. The linear activator 30 can be a pneumatic piston, a hydraulic piston, or an electro-mechanical drive. A pneumatic piston or a hydraulic piston would be controlled by a pump motor and valves. In the shown embodiment, an electro-mechanical drive is used that is controlled by an internal boom elevation motor (not shown).

The vertical mast 28 is connected to a wheeled cart 34 at a gimble joint 36. The gimble joint 36 enables the vertical mast 28 and boom arm 22 to rotate about a vertical axis. The relative movement of the vertical mast 28 relative the wheeled cart 34 is controlled by a mast rotation motor 38.

The wheeled cart 34 has a drive motor 40 for driving at least one of the support wheels 42 of the wheeled cart 34. Accordingly, the rolling movement of the wheeled cart 34 is controlled by the operation of the drive motor 40.

The support wheels 42 of the wheeled cart 34 may be fixed in orientation. However, it is preferred that at least two of the wheels 42 be connected to a steering mechanism 44 that enables the wheels 42 to be selectively turned in different directions. The steering mechanism 44 is preferably controlled by a steering motor 46.

Some stepper motors contain integrated sensors that detect the movements of the motor and provide electrical signals indicative of the movements of the motor. Such motors do not require the use of secondary sensors. In the embodiment of the present invention illustrated in FIG. 2, it can be seen that a sensor is shown adjacent each motor. It will therefore be understood that although the sensors are shown as separate elements from the various motors, the sensors may be incorporated as part of the motors.

The sensors illustrated include a tilt angle sensor 50, a pan angle sensor 51, a boom angle sensor 52, a mast angle sensor 53, a drive motor sensor 54 and a steering angle sensor 55. The tilt angle sensor 50 detects the tilt angle of the camera mount platform 12 as it is varied by the tilt motor 20. The pan angle sensor 51 detects the pan angle of the yoke support 16 as it is varied by the pan motor 26. The boom angle sensor 52 detects changes in the height of the boom arm 22 as it is varied by the boon elevation motor 32. The mast angle sensor 53 detects rotations in the vertical mast 28 as it is varied by the mast rotation motor 38. The drive motor sensor 54 detects operations of the drive motor 40. Lastly, the steering angle sensor 55 detects the changes in steering direction as varied by the steering motor 46.

The operation of the steering motor 46, the drive motor 40, the linear activator 30, the mast rotation motor 38, the pan motor 26 and the tilt motor 20 are all controlled by a central processing unit 56. A user interface 58 is supplied to enable a person to input data into the central processing unit 56. Likewise, a display is provided so that a person can see program displays and data prompts generated by software being run by the central processing unit 56.

A positional memory 60 is provided. The central processing unit 56 stores the data from the various sensors 50, 51, 52, 53, 54, 55 into the memory 60.

To utilize the camera support system 10, a camera 14 is mounted to the camera mount platform 12. Utilizing the user interface 58, the movements of the cart 34, vertical mast 28, boom arm 22, yoke support 16 and camera mount platform 12 can be preprogrammed. Once activated, the central processing unit 56 runs the various motors 20, 26, 32, 38, 40, 46 to create the preprogrammed movements. The sequence of movements can then be stored in the memory 60. The data for the sequence of movements can be recalled at any time to exactly reproduce the sequence of movements. The same camera movements can therefore be performed time after time.

Alternatively, a cameraman can manually move the adjustable elements of the camera support system 10 to meet the improvised instructions of a director. If camera position changes are manually made, the changes are still recorded in the memory 60. The exact sequence of camera movements can therefore be reproduced upon demand.

Since the exact movements of a camera are recorded, they can be transferred between different camera support systems. As a result, a camera in a special effects studio can be programmed to match the exact movements of a different camera in a remote live-action production studio, for example. This enables special effects to be more quickly and easily added to video or film productions.

Certain scenes are shot on location in cities, forests, deserts and the like. As an option a GSP receiver may be provided and joined to the central processor. The GPS receiver can be used to record the exact location of a particular shoot. In this manner, a director many days or weeks after a particular shoot can return to a location and rest cameras at the same locations. In this manner, scenes can be recreated with consistency.

It will be understood that the embodiment of the present invention that is illustrated and described is merely exemplary and that a person skilled in the art can make many variations to those embodiments. For instance, a camera support system can be provided that has less or more moving elements than does the illustrated embodiment. All such embodiments are intended to be included within the scope of the present invention as defined by the claims.

What is claimed is:

1. A method of exactly reproducing complex camera movements at different times, comprising the steps of:
providing an articulated camera support that is capable of articulated movements at multiple joints;
providing articulation sensors at each of said multiple joints to sense any of said articulated movements, wherein said articulation sensors create corresponding articulation data signals for said articulated movements;
providing a wheeled cart having a drive motor and a drive motor sensor for sensing wheeled cart movements caused by said drive motor, wherein said drive motor sensor creates cart data signals indicative of said wheeled cart movements;
mounting a camera to said articulated camera support;
shooting a first scene with said camera, wherein said camera has a shooting position that is altered during said first scene by both said articulated movements of said articulated camera support and said wheeled cart movements of said wheeled cart;
saving both said articulation data signals and said cart data signals created during said first scene; and
utilizing both said articulation data signals and said cart data signals to exactly reproduce said articulation movements and said wheeled cart movements experienced during said first scene in a second scene shot at some time after said first scene.

2. The method according to claim 1, further including the step of providing a processing unit that receives said articulation data signals and said cart data signals.

3. The method according to claim 2, further including the step of providing orientation control motors on said articulated camera support for selectively causing movement in at least some of said multiple joints.

4. The method according to claim 3, wherein said orientation control motors are selectively controlled by said processing unit.

5. The method according to claim 2, further including the step of selectively controlling said drive motor with said processing unit.

6. The method according to claim 1, wherein said step of saving said data signals includes storing said data signals in a digital memory.

7. The method according to claim 2, wherein said step of utilizing both said articulation data signals and said cart data signals to exactly reproduce said articulation movements and said wheeled cart movements experienced by said articulated camera support includes programming said processing unit with both said articulation data signals and said cart data signals, wherein said processing unit operates both said articulated camera support and said drive motor to reproduce said articulation movements and said wheeled cart movements.

8. A method of reproducing complex camera movements, comprising the steps of:
   providing a boom arm supported by a wheeled cart, wherein said boom arm is movable through a range of positions relative to said wheeled cart;
   providing control motors on said boom arm and said wheeled cart for selectively causing movement in said boom arm and said wheeled cart;
   mounting a camera to said boom arm;
   shooting a scene with said camera, wherein said boom arm and said wheeled cart are moved through a series of motions during said scene by said control motors;
   recording said series of motions to produce a recorded motion sequence; and
   utilizing said recorded motion sequence to operate said control motors and reproduce said series of motions in said boom arm and said wheeled cart.

9. The method according to claim 8, further including the step of providing a processing unit that is supported by said wheeled cart and stores said recorded motion sequence.

10. The method according to claim 8, wherein said control motors are selectively controlled by said processing unit.

11. The method according to claim 9, further including the step of providing sensors for detecting relative movement of said boom arm and said wheeled cart, wherein said sensors are read by said processing unit.

12. The method according to claim 9, wherein said step of utilizing said recorded motion sequence to operate said control motors and reproduce said series of motions in said boom arm and said wheeled cart includes programming said processing unit with said recorded motion sequence.

* * * * *